US010452376B2

(12) United States Patent
Li

(10) Patent No.: US 10,452,376 B2
(45) Date of Patent: Oct. 22, 2019

(54) METHOD FOR IDENTIFYING FILE AND MOBILE TERMINAL

(71) Applicant: Guangdong Oppo Mobile Telecommunications Corp., Ltd., Dongguan, Guangdong (CN)

(72) Inventor: Hui Li, Guangdong (CN)

(73) Assignee: Guangdong Oppo Mobile Telecommunications Corp., Ltd., Dongguan (CN)

(*) Notice: Subject to any disclaimer, the term of this patent is extended or adjusted under 35 U.S.C. 154(b) by 0 days.

(21) Appl. No.: 16/244,813

(22) Filed: Jan. 10, 2019

(65) Prior Publication Data

US 2019/0146770 A1 May 16, 2019

Related U.S. Application Data

(63) Continuation of application No. 16/119,155, filed on Aug. 31, 2018, which is a continuation of application No. PCT/CN2017/086544, filed on May 31, 2017.

(30) Foreign Application Priority Data

May 31, 2016 (CN) .......................... 2016 1 0380642

(51) Int. Cl.
*G06F 8/61* (2018.01)
*G06F 9/445* (2018.01)

(52) U.S. Cl.
CPC ................ *G06F 8/61* (2013.01); *G06F 9/445* (2013.01)

(58) Field of Classification Search
None
See application file for complete search history.

(56) References Cited

U.S. PATENT DOCUMENTS

| 6,289,512 B1 * | 9/2001 | Edwards | G06F 8/61 |
| | | | 717/178 |
| 6,769,115 B1 * | 7/2004 | Oldman | G06F 8/36 |
| | | | 717/121 |

(Continued)

FOREIGN PATENT DOCUMENTS

| CN | 102902687 A | 1/2013 |
| CN | 103646047 A | 3/2014 |

(Continued)

OTHER PUBLICATIONS

International search report issued in corresponding international application No. PCT/CN2017/086544 dated Aug. 7, 2017.

(Continued)

*Primary Examiner* — Philip Wang
(74) *Attorney, Agent, or Firm* — Young Basile Hanlon & MacFarlane, P.C.

(57) ABSTRACT

A method for identifying a file and a mobile terminal are provided. The method includes the following. An installation file and an end tag position of a file directory of the installation file are acquired. A capacity which the file directory occupies of the installation file is acquired. A start tag position of the file directory is determined by determining a distance of the file directory in relative to a start position of the installation file according to the end tag position of the file directory and the capacity which the file directory occupies of the installation file. Query for a file header identifier in the file directory according to the start tag position of the file directory. A Lib library directory is acquired from the file directory. A file indicated by the file header identifier is identified by analyzing the file header identifier.

6 Claims, 6 Drawing Sheets

(56) References Cited

U.S. PATENT DOCUMENTS

| | | | | |
|---|---|---|---|---|
| 8,024,382 | B2* | 9/2011 | Evans | G06F 16/113 |
| | | | | 707/821 |
| 2004/0044996 | A1* | 3/2004 | Atallah | G06F 8/71 |
| | | | | 717/169 |
| 2010/0242037 | A1* | 9/2010 | Xie | G06F 8/61 |
| | | | | 717/178 |
| 2011/0099516 | A1* | 4/2011 | Hughes | G06F 8/61 |
| | | | | 715/810 |
| 2013/0047149 | A1* | 2/2013 | Xu | G06F 8/61 |
| | | | | 717/175 |
| 2013/0191352 | A1 | 7/2013 | Barsness et al. | |
| 2015/0220317 | A1 | 8/2015 | Li et al. | |
| 2016/0378458 | A1* | 12/2016 | Pan | G06F 11/1433 |
| | | | | 717/169 |

FOREIGN PATENT DOCUMENTS

| | | |
|---|---|---|
| CN | 104199673 A | 12/2014 |
| CN | 104572966 A | 4/2015 |
| CN | 104573514 A | 4/2015 |
| CN | 104866504 A | 8/2015 |
| CN | 105278989 A | 1/2016 |

OTHER PUBLICATIONS

Anonymous: "How does one find the start of the "Central Directory" in zip files ?", Jan. 26, 2011 (Jan. 26, 2011), pp. 1-3.

Anonymous: "zip (file format)—wikipedia", May 5, 2016 (May 5, 2016), pp. 1-8.

Anonymous: "Android application package—wikipedia", May 24, 2016 (May 24, 2016), pp. 1-4.

Extended European search report issued in corresponding European application No. 17805842.6 dated Mar. 13, 2019.

\* cited by examiner

METHOD FOR IDENTIFYING FILE AND MOBILE TERMINAL

CROSS-REFERENCE TO RELATED APPLICATION(S)

This application is a continuation of U.S. application Ser. No. 16/119,155, filed on Aug. 31, 2018, which is a continuation of International Application No. PCT/CN2017/086544, filed on May 31, 2017, which claims priority to Chinese Patent Application No. 201610380642.8, filed on May 31, 2016, the disclosures of all of which are hereby incorporated by reference in their entireties.

TECHNICAL FIELD

This disclosure relates to the field of electronic technology, and particularly to a method for identifying a file and a mobile terminal.

BACKGROUND

Currently, more and more applications are supported by smart terminals, but it is also accompanied by a decrease in the boot speed, leading to longer boot time required for the smart terminal and longer installation time for applications. When the smart terminal is booted or an application is installed, an Android Package (i.e., APK file) of the application needs to be scanned. As the APK file itself is a zip package, when scanning the APK file, all files in the APK file need to be decompressed to identify a native library file and a RenderScript file stored in the APK file. Then the native library file and the RenderScript file are traversed to achieve the scanning. However, in the process of traversing the native library file and the RenderScript file, a lot of scan time will be consumed, resulting in increased time to boot or install applications.

SUMMARY

The disclosure provides a method for identifying a file and a mobile terminal.

According to a first aspect of the disclosure, a method for identifying a file is provided. The method includes the follows.

An installation file and an end tag position of a file directory of the installation file are acquired. A capacity which the file directory occupies of the installation file is acquired. A start tag position of the file directory is determined by determining a distance of the file directory in relative to a start position of the installation file according to the end tag position of the file directory and the capacity which the file directory occupies of the installation file. Query for a file header identifier in the file directory according to the start tag position of the file directory. A Lib library directory is acquired from the file directory. A file indicated by the file header identifier is identified by analyzing the file header identifier as follows. The file header identifier containing a first identifier is acquired from the Lib library directory, where the first identifier is configured to indicate a dynamic link library file. The file indicated by the file header identifier containing the first identifier is identified as a dynamic link library file when the file header identifier is determined to contain the first identifier. Determine that a subdirectory of the Lib library directory supports an application binary interface, where the file indicated by the file header identifier belongs to the subdirectory, and the file header identifier contains the first identifier.

According to a second aspect of the disclosure, a mobile terminal is provided. The mobile terminal includes an acquiring module, a determining module, and an identifying module. The acquiring module is configured to acquire an installation file and an end tag position of a file directory of the installation file, to acquire a capacity which the file directory occupies of the installation file, to acquire a Lib library directory from the file directory, and to acquire a file header identifier containing a first identifier from the Lib library directory, where the first identifier is configured to indicate a dynamic link library file. The determining module is configured to determine a start tag position of the file directory by determining a distance of the file directory in relative to a start position of the installation file according to the end tag position of the file directory and the capacity which the file directory occupies of the installation file. The identifying module is configured to query for the file header identifier in the file directory according to the start tag position of the file directory determined by the determining module, to identify a file indicated by the file header identifier containing the first identifier as a dynamic link library file when the file header identifier is determined to contain the first identifier, and to determine that a subdirectory of the Lib library directory supports an application binary interface, where the file indicated by the file header identifier belongs to the subdirectory and the file header identifier contains the first identifier.

BRIEF DESCRIPTION OF DRAWINGS

To describe technical solutions in the implementations of the present disclosure more clearly, the following briefly introduces the accompanying drawings required for describing the implementations. Apparently, the accompanying drawings in the following description illustrate some implementations of the present disclosure. Those of ordinary skill in the art may also obtain other drawings based on these accompanying drawings without creative efforts.

DETAILED DESCRIPTION

Figure 1:
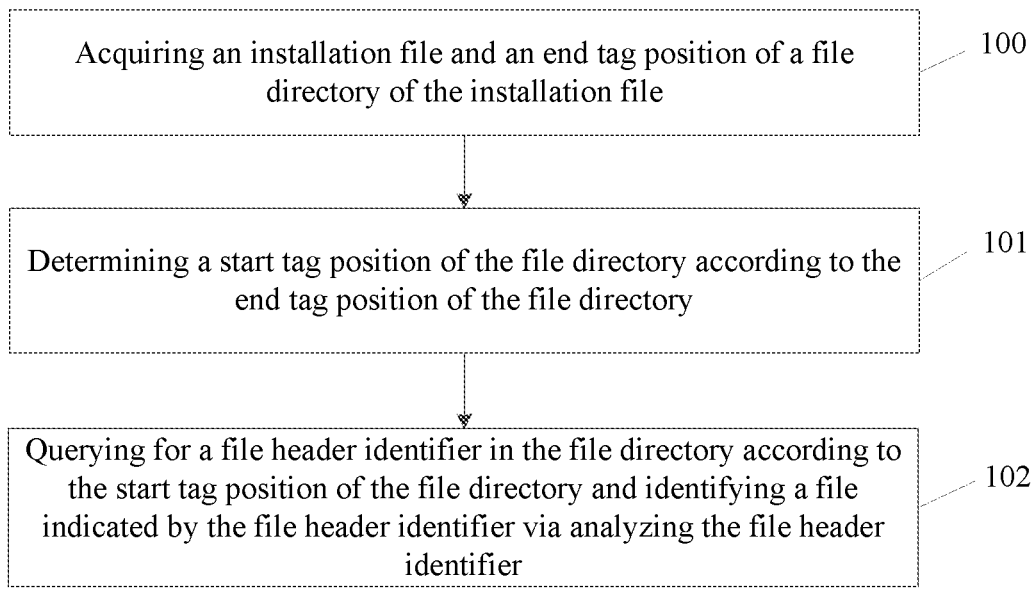
FIG. 1 is a schematic flow chart illustrating a method for identifying a file according to an implementation of the disclosure.

Technical solutions in implementations of the present disclosure will be described clearly and completely hereinafter with reference to the accompanying drawings in the implementations of the present disclosure. Apparently, the described implementations are merely some rather than all implementations of the present disclosure. All other imple-} mentations obtained by those of ordinary skill in the art based on the implementations of the present disclosure without creative efforts shall fall within the protection scope of the present disclosure.

By adopting the implementations of the disclosure, a file indicated by a file header identifier can be identified via scanning the file header identifier of an installation file and scan time of the installation file before booting a mobile terminal or installing an application can be reduced.

The terms "first", "second", "third", "fourth", and the like used in the specification, the claims, and the accompany drawings of the present disclosure are used to distinguish different objects rather than describe a particular order. The terms "include", "comprise", and "have" as well as variations thereof are intended to cover non-exclusive inclusion. For example, a process, method, system, product, or apparatus including a series of steps or units is not limited to the listed steps or units, on the contrary, it can optionally include other steps or units that are not listed; alternatively, other steps or units inherent to the process, method, product, or device can be included either.

Terms mentioned in this context are given below.

Dynamic-link library (DLL) is a module that contains functions and data that can be used by another module (application or DLL). A DLL can define two kinds of functions: exported and internal. The exported functions are intended to be called by other modules, as well as from within the DLL where they are defined. Internal functions are typically intended to be called only from within the DLL where they are defined. Although a DLL can export data, its data is generally used only by its functions. However, there is nothing to prevent another module from reading or writing that address.

RenderScript: it is currently an android based framework which is used for running applications that perform very highly computational tasks. RenderScript is extremely useful for applications which perform following types of actions: 3D Rendering, image processing, computational photography, and computer vision.

Library: it is structurally the same as an application (app) module. It provides everything you need to build your app, including source code, resource files, and manifests.

According to implementations of the disclosure, a method for identifying a file is provided. In this method, an installation file and an end tag position of a file directory of the installation file are acquired respectively. A capacity which the file directory occupies of the installation file is acquired (in other words, a size of the file directory of the installation file is acquired). A start tag position of the file directory is determined by determining a distance of the file directory in relative to a start position of the installation file according to the end tag position of the file directory and the capacity which the file directory occupies of the installation file. That is, the start tag position of the file directory is determined by determining a distance between the file directory and a start position of the installation file. Query for a file header identifier in the file directory according to the start tag position of the file directory. A file indicated by the file header identifier is identified by analyzing the file header identifier as follows. The file header identifier containing a first identifier is acquired from the Lib library directory, where the first identifier is configured to indicate a dynamic link library file. The file indicated by the file header identifier containing the first identifier is identified as a dynamic link library file when the file header identifier is determined to contain the first identifier. Determine that a subdirectory of the Lib library directory supports an application binary interface, where the file indicated by the file header identifier belongs to the subdirectory, and the file header identifier contains the first identifier.

FIG. 1 is a schematic flow chart illustrating a method for identifying a file according to an implementation of the disclosure. Mobile terminals include, for example, mobile phones, tablets, laptops, palmtops, mobile internet devices (MID), wearable devices such as smart watches (for example, iwatch®), smart bracelets, pedometers and the like, and other terminal devices.

As illustrated in FIG. 1, in this implementation, the method begins at block 100.

At block 100, an installation file and an end tag position of a file directory of the installation file are acquired.

As one implementation, when booting a mobile terminal or installing an application, the installation file of the application needs to be acquired and a structure of the file directory in a format of the installation file needs to be extracted to achieve a partial scan. The applications are indicated by various files in the file directory. The file directory contains file header identifiers each for indicating a file. Various files can be identified via scanning the file header identifiers. Consequently, the operation of decompressing all files in the installation file to identify a native library file and a RenderScript file can be omitted. As the installation file itself is a zip package, the end tag position of the file directory of the zip package can be obtained.

As one implementation, the end tag position of the file directory of the zip package can be at 0x06054b50 of the installation file in a binary format.

At block 101, a start tag position of the file directory is determined according to the end tag position of the file directory.

As one implementation, the mobile terminal can determine the start tag position of the file directory according to the end tag position of the file directory, so as to determine a position range of the file directory in the installation file in the binary format and the start tag position of the file directory in the binary format.

At block 102, a file header identifier in the file directory is queried for according to the start tag position of the file directory and a file indicated by the file header identifier is identified via analyzing the file header identifier.

As one implementation, after determining the position range of the file directory in the installation file in the binary format and the start tag position of the file directory in the binary format, all file header identifiers for indicating files are queried for in a traversal manner according to the start tag position of the file directory. After that, a file list is generated according to all the file header identifiers queried. The files indicated by the file header identifiers are then identified via analyzing each file header identifier in the file list. After completing the process of analyzing the file header identifiers, the application can be initialized when booting the mobile terminal or installing the application.

As one implementation, a position of the file header identifier is at 0x04034b50 of the installation file in the binary format.

According to the implementation, when booting the mobile terminal or installing an application, the installation file and the end tag position of the file directory of the installation file are acquired first. Then the start tag position of the file directory is determined according to the end tag position of the file directory. At last, the file header identifier in the file directory is queried for according to the start tag position of the file directory and the file indicated by the file header identifier is identified via analyzing the file header identifier. In this way, the process of decompressing all files in the installation file can be omitted. Therefore, scan time of the installation file before booting the mobile terminal or installing the application can be reduced, and efficiency of booting the mobile terminal or installing the application can be improved.

Figure 2:
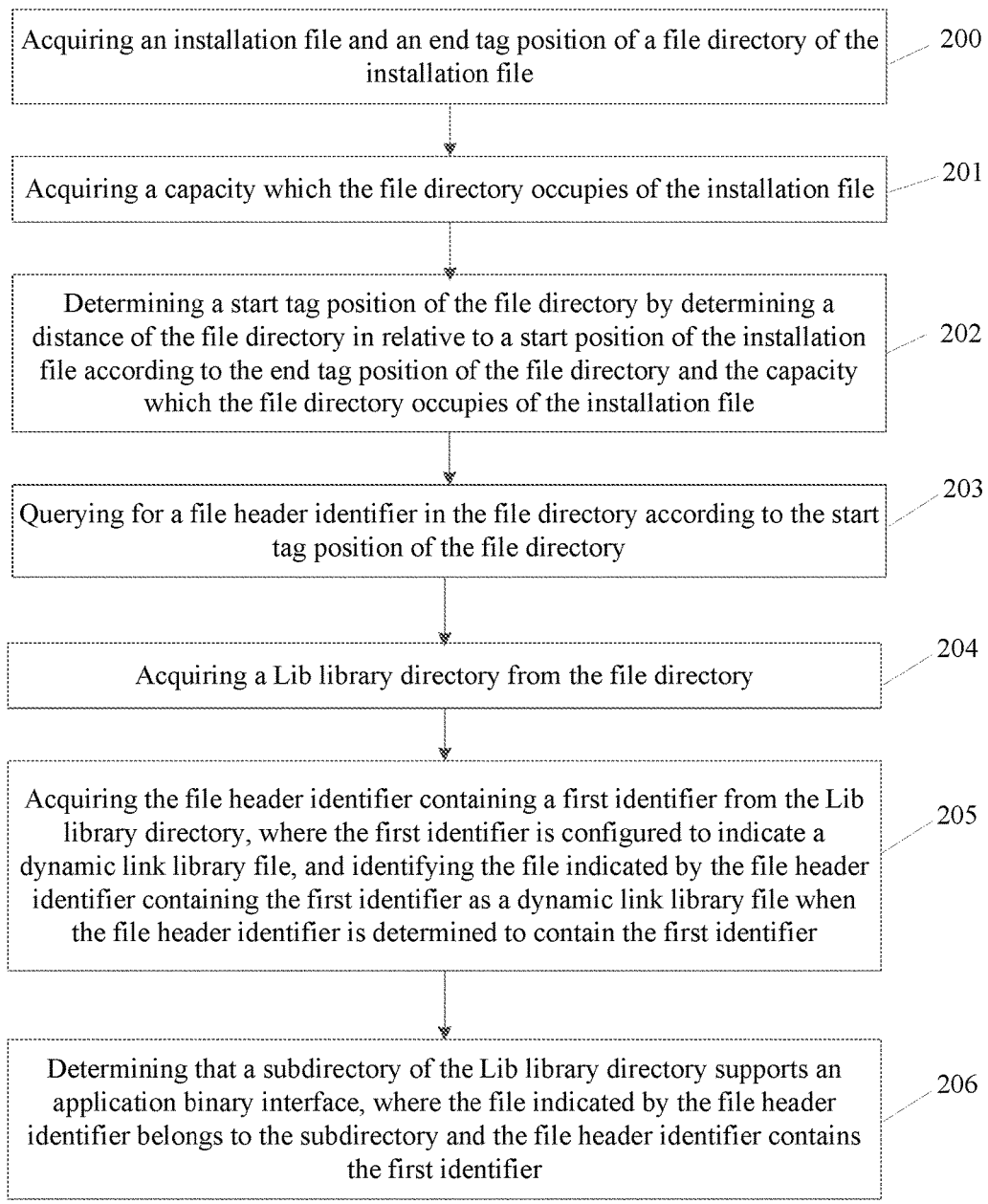
FIG. 2 is a schematic flow chart illustrating a method for identifying a file according to another implementation of the disclosure.

Similar to the method of FIG. 1, another method is further provided. FIG. 2 is a schematic flow chart illustrating a method for identifying a file according to another implementation of the disclosure. Mobile terminals include, for example, mobile phones, tablets, laptops, palmtops, mobile internet devices (MID), wearable devices such as smart watches (for example, iwatch®), smart bracelets, pedometers and the like, and other terminal devices.

As illustrated in FIG. 2, the method begins at block 200.

At block 200, an installation file and an end tag position of a file directory of the installation file are acquired.

As one implementation, when booting a mobile terminal or installing an application, the installation file of the application needs to be acquired and a structure of the file directory in a format of the installation file need to be extracted to achieve a partial scan. The applications are indicated by various files in the file directory. The file directory contains file header identifiers each for indicating a file. Various files can be identified via scanning the file header identifiers. Consequently, the operation of decompressing all files in the installation file to identify a native library file and a RenderScript file can be omitted. As the installation file itself is a zip package, the end tag position of the file directory of the zip package can be obtained.

As one implementation, the end tag position of the file directory of the zip package can be at 0x06054b50 of the installation file in a binary format.

At block 201, a capacity which the file directory occupies of the installation file is acquired. In other words, a size of the file directory of the installation file is acquired.

At block 202, a start tag position of the file directory is determined by determining a distance of the file directory in relative to a start position of the installation file (that is, a distance between the file directory and a start position of the installation file, a distance between the start tag position of the file directory and the start position of the installation file) according to the end tag position of the file directory and the capacity which the file directory occupies of the installation file.

As one implementation, after determining the end tag position of the file directory, the mobile terminal can acquire the capacity (for example, the number of bytes) of which the file directory occupies the installation file. Thereafter, the distance between the file directory and the start position of the installation file is determined according to the end tag position of the file directory and the number of bytes of the file directory occupying the installation file.

As one implementation, after determining the distance between the file directory and the start position of the installation file, the mobile terminal can determine the start tag position of the file directory. For example, the number of bytes of which the file directory occupies the installation file is 12, in this situation, according to the end tag position of the file directory and the occupation of 12 bytes, the offset of the file directory relative to the start position of the installation file is determined as 16 bytes. That is, the start tag position of the file directory is offset by 16 bytes relative to the start position of the installation file, and the capacity of the file directory is 12 bytes.

At block 203, a file header identifier in the file directory is queried for according to the start tag position of the file directory.

At block 204, a Lib library directory is acquired from the file directory.

A file indicated by the file header identifier is identified by analyzing the file header identifier as follows at block 205.

At block 205, the file header identifier containing a first identifier is acquired from the Lib library directory, where the first identifier is configured to indicate a dynamic link library file; the file indicated by the file header identifier containing the first identifier is identified as a dynamic link library file when the file header identifier is determined to contain the first identifier.

At block 206, determine that a subdirectory of the Lib library directory supports an application binary interface, where the file indicated by the file header identifier belongs to the subdirectory and the file header identifier contains the first identifier.

As one implementation, after determining the start tag position of the file directory in the binary format, traverse from the start tag position of the file directory to query for all file header identifiers for indicating files. Thereafter, a file list is generated according to all the file header identifiers queried. And then, the file indicated by the file header identifier is identified via analyzing each file header identifier in the file list. After completing the process of analyzing the file header identifiers, the application can be initialized when booting the mobile terminal or installing the application.

As one implementation, the file indicated by the file header identifier is identified by analyzing the file header identifier as follows. Whether the file header identifier contains a second identifier configured to indicate a RenderScript file is determined. The file indicated by the file header identifier is identified as a RenderScript file when the file header identifier contains the second identifier.

As one implementation, the method further includes the following. A capacity of the file indicated by the file header identifier, the most recent modification time at which the file indicated by the file header identifier was modified relative to current time, and a check value of the file indicated by the file header identifier are acquired. Whether the file indicated by the file header identifier is the same as the dynamic link library file contained in the Lib library directory is determined according to the capacity of the file indicated by the file header identifier, the most recent modification time at which the file indicated by the file header identifier was modified relative to the current time, and the check value of the file indicated by the file header identifier. The file indicated by the file header identifier is decompressed into the Lib library directory when the file indicated by the file header identifier is different from the dynamic link library file.

As one implementation, a position of the file header identifier is at 0x04034b50 of the installation file in the binary format.

According to the implementation, when booting the mobile terminal or installing the application, the installation file and the end tag position of the file directory of the installation file are acquired first. Then, the start tag position of the file directory is determined according to the end tag position of the file directory. At last, the file header identifier in the file directory is queried for according to the start tag position of the file directory and the file indicated by the file header identifier is identified via analyzing the file header identifier. In this way, it is possible to omit the process of decompressing all files in the installation file. As a result, scan time of the installation file before booting the mobile terminal or installing the application can be reduced, and efficiency of booting the mobile terminal or installing the application can be improved.

Figure 3:
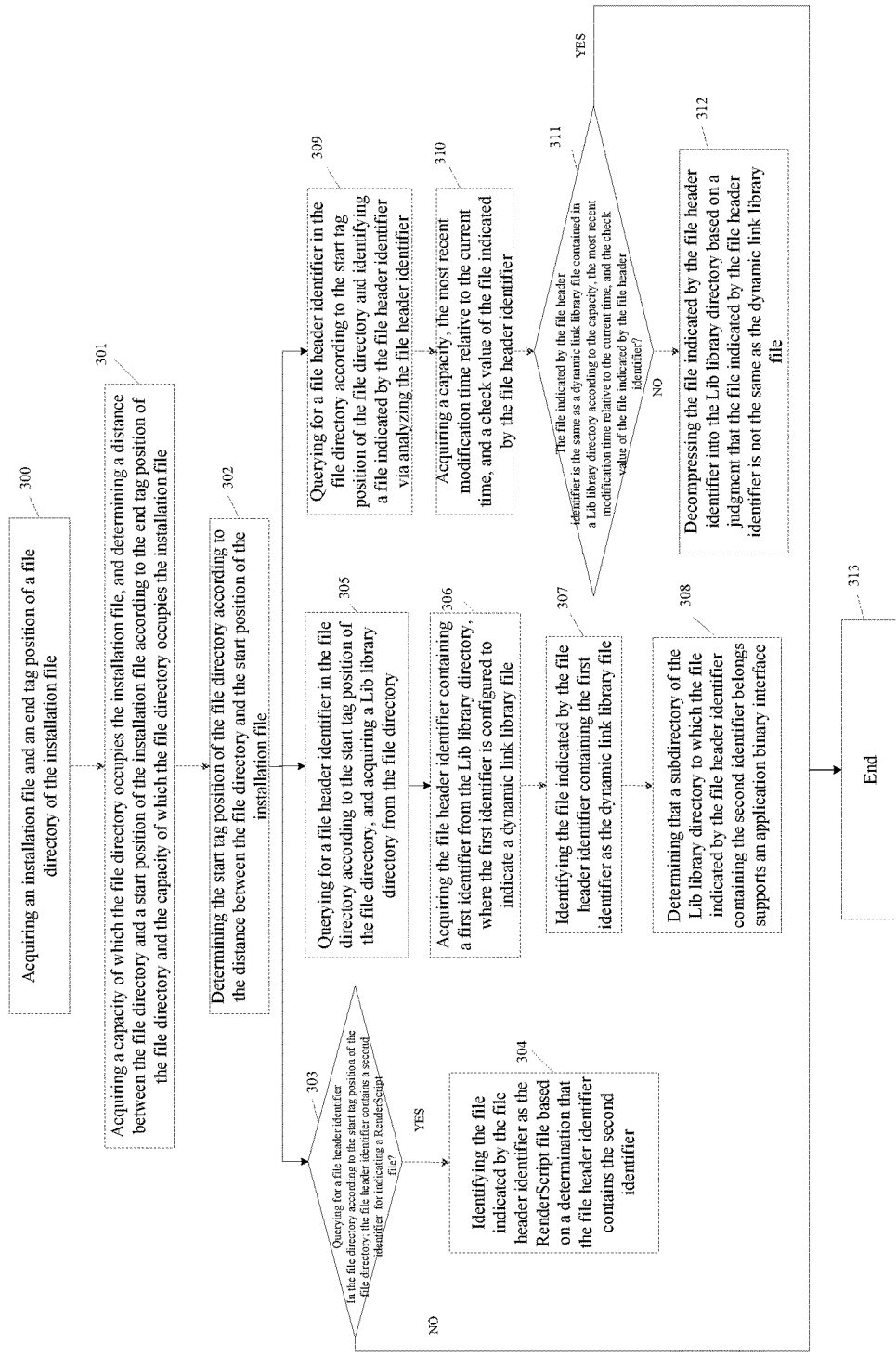
FIG. 3 is a schematic flow chart illustrating a method for identifying a file according to yet another implementation of the disclosure.

Similar to the methods of FIG. 1 and FIG. 2, another method is further provided. FIG. 3 is a schematic flow chart illustrating a method for identifying a file according to yet another implementation of the disclosure. Mobile terminals include, for example, mobile phones, tablets, laptops, palmtops, mobile internet devices (MID), wearable devices such as smart watches (for example, iwatch®), smart bracelets, pedometers and the like, and other terminal devices.

As illustrated in FIG. 3, the method begins at block 300.

At block 300, an installation file and an end tag position of a file directory of the installation file are acquired.

As one implementation, when booting a mobile terminal or installing an application, the installation file of the application needs to be acquired and a structure of the file directory in a format of the installation file needs to be extracted to achieve a partial scan. The applications are indicated by various files in the file directory. The file directory contains file header identifiers each for indicating a file. Various files can be identified via scanning the file header identifiers. Consequently, the operation of identifying a native library file and a RenderScript file by decompressing all files in the installation file can be omitted. Since the installation file itself is a zip package, the end tag position of the file directory of the zip package can be obtained.

As one implementation, the end tag position of the file directory of the zip package can be at 0x06054b50 of the installation file in a binary format.

At block 301, a capacity of which the file directory occupies the installation file is acquired, and a distance between the file directory and a start position of the installation file is determined according to the end tag position of the file directory and the capacity of which the file directory occupies the installation file.

As one implementation, after determining the end tag position of the file directory, the mobile terminal can acquire the capacity (for example, the number of bytes) of which the file directory occupies the installation file. Thereafter, the distance between the file directory and the start position of the installation file is determined according to the end tag position of the file directory and the number of bytes of which the file directory occupies the installation file.

At block 302, the start tag position of the file directory is determined according to the distance between the file directory and the start position of the installation file.

As one implementation, after determining the distance between the file directory and the start position of the installation file, the mobile terminal can determine the start tag position of the file directory. For example, the number of bytes of which the file directory occupies the installation file is 12, in this situation, according to the end tag position of the file directory and the occupation of 12 bytes, the offset of the file directory relative to the start position of the installation file is determined as 16 bytes. That is, the start tag position of the file directory is offset by 16 bytes relative to the start position of the installation file, and the capacity of the file directory is 12 bytes.

At block 303, a file header identifier in the file directory is queried for according to the start tag position of the file directory, and whether the file header identifier contains a second identifier for indicating a RenderScript file is determined.

As one implementation, after determining the start tag position of the file directory in the binary format, all file header identifiers for indicating files are queried for in a traversal manner according to the start tag position of the file directory. After that, a file list is generated according to all the file header identifiers queried. The file indicated by the file header identifier is then identified via analyzing each file header identifier in the file list. Whether the file header identifier contains the second identifier can be determined, where the second identifier can be .bc, configured to indicate the RenderScript file. The mobile terminal can determine whether there is any RenderScript file by judging whether the file header identifier contains the second identifier. If the RenderScript file exists, proceed to block 313; otherwise, the scan process ends.

At block 304, identify the file indicated by the file header identifier as the RenderScript file based on a determination that the file header identifier contains the second identifier.

As one implementation, when the file header identifier contains the second identifier, the file indicated by the file header identifier can be identified as the RenderScript file. Thereafter, a system is notified that there exists the RenderScript file, and identification for the file is completed.

A block 305, a file header identifier in the file directory is queried for according to the start tag position of the file directory, and a Lib library directory is acquired from the file directory.

As one implementation, the mobile terminal generates a file list by determining the file header identifier in the file directory and judges whether there is any Lib library directory in the file directory. If yes, the Lib library directory is acquired.

At block 306, the file header identifier containing a first identifier is acquired from the Lib library directory, where the first identifier is configured to indicate a dynamic link library file.

As one implementation, the Lib library directory contains the file header identifier. The mobile terminal can acquire the file header identifier containing the first identifier from the Lib library directory, where the first identifier can be .so (shared object), configured to indicate the dynamic link library file.

At block 307, identify the file indicated by the file header identifier containing the first identifier as the dynamic link library file.

As one implementation, when determining that the file header identifier contains the first identifier, the mobile terminal identifies the file indicated by the file header identifier as .so file.

At block 308, determine that a subdirectory of the Lib library directory to which the file indicated by the file header identifier containing the first identifier belongs supports an application binary interface (abi).

As one implementation, after identifying the .so file, the mobile terminal acquires the subdirectory of the Lib library directory to which the .so file belongs and determines that the subdirectory can be matched with the application binary interface, where the subdirectory can be matched with any of: arm64-v8a, armeabi-v7a, and armeabi of the application binary interface. If the subdirectory of the Lib library directory to which the .so file belongs supports any one of arm64-v8a, armeabi-v7a, and armeabi, it is determined that the subdirectory of the Lib library directory to which the .so file belongs supports the application binary interface.

At block 309, a file header identifier in the file directory is queried for according to the start tag position of the file directory and a file indicated by the file header identifier is identified via analyzing the file header identifier.

As one implementation, operations at blocks 309-312 relates to identifying, querying for, and copying of the native library file. The mobile terminal generates a file list by determining the file header identifier in the file directory, and identifies the file indicated by the file header identifier via analyzing the file header identifier.

At block 310, a capacity, the most recent modification time relative to the current time, and a check value of the file indicated by the file header identifier are acquired.

As one implementation, the capacity, the most recent modification time relative to the current time, and the check value of the file indicated by the file header identifier can be acquired. The capacity of the file indicated by the file header identifier can be a decompressed size of the file. For example, referring to a start position of the file header identifier, the decompressed size of the file indicated by the file header identifier can be acquired at a position which is offset by 22 bytes relative to the start position of the file header identifier, the most recent modification time relative to the current time of the file indicated by the file header identifier can be acquired at a position which is offset by 10 bytes relative to the start position of the file header identifier, and the check value of the file indicated by the file header identifier can be acquired at a position offset relative to the start position of the file header identifier by 14 bytes.

In one possible implementation, the check value of the file indicated by the file header identifier is a check value of cyclic redundancy check (CRC).

At block 311, whether the file indicated by the file header identifier is the same as a dynamic link library file contained in a Lib library directory is judged according to the capacity, the most recent modification time relative to the current time, and the check value of the file indicated by the file header identifier.

As one implementation, to judge whether the file indicated by the file header identifier is the same as the .so file contained in the Lib library directory, the capacity, the most recent modification time, and the check value of the file indicated by the file header identifier are compared with a capacity, the most recent modification time relative to the current time, and a check value of the dynamic link library file (.so file) contained in the Lib library directory. In addition, whether the .so file contained in the Lib library directory is modified or does not exist can also be judged. If the file indicated by the file header identifier is not the same as the .so file contained in the Lib library directory, it is determined that the .so file contained in the Lib library directory is modified or does not exist, advance to block 312; on the other hand, if the file indicated by the file header identifier is the same as the .so file contained in the Lib library directory, advance to block 313 and the scan process ends.

In one possible implementation, in addition to the Lib library directory, the .so file can also be contained in at least one of: a directory of data, a directory of applications (app), and a directory of an application package names.

At block 312, the file indicated by the file header identifier is depressed into the Lib library directory based on a judgment that the file indicated by the file header identifier is not the same as the dynamic link library file.

As one implementation, when determining that the file indicated by the file header identifier is not the same as the .so file contained in the Lib library directory, the mobile terminal determines that the .so file contained in the Lib library directory is modified or does not exist. In this case, the file indicated by the file header identifier can be depressed and then stored in the Lib library directory.

Moreover, the file indicated by the file header identifier can be decompressed into at least one of: the directory of the data, the directory of the applications, and the directory of the application package names.

At block 313, scan process ends.

It is to be noted that, operations at blocks 303-304 and 313, operations at blocks 305-308, and operations at blocks 309-313 may be performed in parallel. The disclosure is not particularly limited.

According to the implementation, when booting the mobile terminal or installing the application, the installation file and the end tag position of the file directory of the installation file are acquired first. And then, the start tag position of the file directory is determined according to the end tag position of the file directory. At last, the file header identifier in the file directory is queried for according to the start tag position of the file directory and the file indicated by the file header identifier is identified via analyzing the file header identifier. In this way, the process of decompressing all files in the installation file can be omitted. Consequently, it is possible to reduce scan time of the installation file before booting the mobile terminal or installing the application, and improve efficiency of booting the mobile terminal or installing the application.

Figure 4:
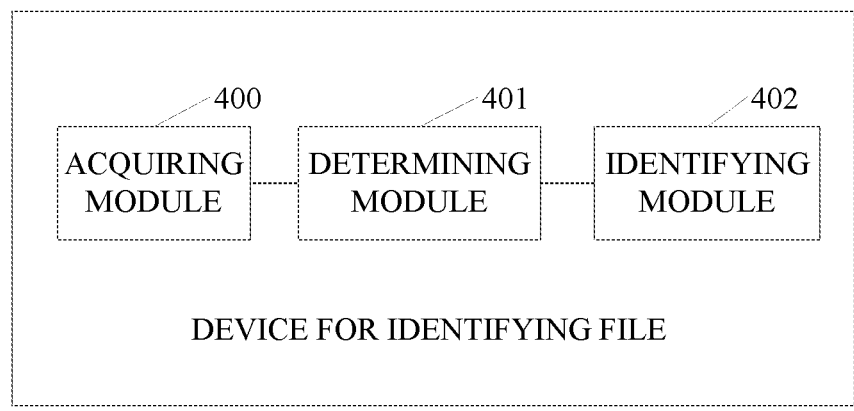
FIG. 4 is a schematic structural diagram illustrating a device for identifying a file according to an implementation of the disclosure.

FIG. 4 is a schematic structural diagram illustrating a device for identifying a file according to an implementation of the disclosure. The device illustrated in FIG. 4 can execute the methods illustrated in FIGS. 1-3. The disclosure will not be repeated herein. The device illustrated in FIG. 4 includes an acquiring module 400, a determining module 401, and an identifying module 402. The acquiring module 400, determining module 401, and identifying module 402 as well as other units depicted below may be integrated into a processing unit such as a processor, for example, processor 601 of FIG. 6.

The acquiring module 400 is configured to acquire an installation file and an end tag position of a file directory of the installation file.

The determining module 401 is configured to determine a start tag position of the file directory according to the end tag position of the file directory acquired by the acquiring module 400.

The identifying module 402 is configured to query for a file header identifier in the file directory according to the start tag position of the file directory determined by the determining module 401 and identify a file indicated by the file header identifier via analyzing the file header identifier.

As one implementation, when booting a mobile terminal or installing an application, the installation file of the application needs to be acquired and a structure of the file directory in a format of the installation file is extracted to achieve a partial scan. The applications are indicated by various files in the file directory. Various files are identified via scanning the file header identifier, of the file directory, for indicating each file. Consequently, the operation of decompressing all files in the installation file to identify a native library file and a RenderScript file can be omitted. As the installation file itself is a zip package, the end tag position of the file directory of the zip package can be acquired.

As one implementation, the mobile terminal can determine the start tag position of the file directory according to the end tag position of the file directory, so as to determine a position range of the file directory of the installation file in the binary format and the start tag position of the file directory in the binary.

As one implementation, after determining the position range of the file directory of the installation file in the binary format and the start tag position of the file directory in the binary format, all the file header identifiers for indicating files are queried for in a traversal way according to the start tag position of the file directory. After that, a file list is generated according to all the file header identifiers queried. The file indicated by the file header identifier is then identified via analyzing each file header identifier in the file list. After the process of analyzing each file header identifier is completed, the application can be initialized when booting the mobile terminal or installing the application.

Figure 5:
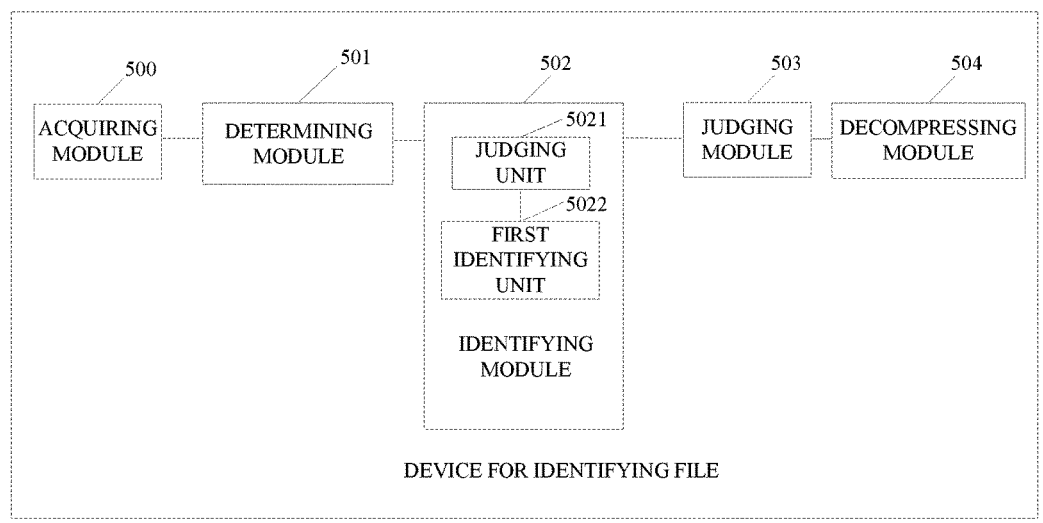
FIG. 5 is a schematic structural diagram illustrating another device for identifying a file according to an implementation of the disclosure.

FIG. 5 is a schematic structural diagram illustrating another device for identifying a file according to an implementation of the disclosure. As illustrated in FIG. 5, the device for identifying a file includes an acquiring module 500, a determining module 501, and an identifying module 502.

The acquiring module 500 is configured to acquire an installation file and an end tag position of a file directory of the installation file, to acquire a capacity which the file directory occupies of the installation file, to acquire a Lib library directory from the file directory, and to acquire a file header identifier containing a first identifier from the Lib library directory, where the first identifier is configured to indicate a dynamic link library file.

The determining module 501 is configured to determine a start tag position of the file directory by determining a distance of the file directory in relative to a start position of the installation file according to the end tag position of the file directory and the capacity which the file directory occupies of the installation file.

The identifying module 502 is configured to query for the file header identifier in the file directory according to the start tag position of the file directory determined by the determining module 501, to identify a file indicated by the file header identifier containing the first identifier as a dynamic link library file when the file header identifier is determined to contain the first identifier, and to determine that a subdirectory of the Lib library directory supports an application binary interface, where the file indicated by the file header identifier belongs to the subdirectory and the file header identifier contains the first identifier.

As one implementation, as illustrated in FIG. 5, the identifying module 502 includes a judging unit 5021 and a first identifying unit 5022. The judging unit 5021 is configured to determine whether the file header identifier contains a second identifier configured to indicate a RenderScript file. The first identifying unit 5022 is configured to identify the file indicated by the file header identifier as a RenderScript file when the judging unit 5021 determines that the file header identifier contains the second identifier.

As one implementation, the acquiring module 500 is further configured to acquire a capacity of the file indicated by the file header identifier, the most recent modification time at which the file indicated by the file header identifier was modified relative to current time, and a check value of the file indicated by the file header identifier.

As one implementation, as illustrated in FIG. 5, the device further includes a judging module 503 and a decompressing module 504.

The judging module 503 is configured to determine whether the file indicated by the file header identifier is the same as the dynamic link library file contained in the Lib library directory according to the capacity of the file indicated by the file header identifier, the most recent modification time (i.e., the most recent modification time at which the file indicated by the file header identifier was modified relative to the current time), and the check value of the file indicated by the file header identifier.

The decompressing module 504 is configured to decompress the file indicated by the file header identifier into the Lib library directory when the judging module 503 determines that the file indicated by the file header identifier is different from the dynamic link library file.

The end tag position of the file directory of the installation file is at 0x06054b50 of the installation file in a binary format.

A position of the file header identifier is at 0x04034b50 of the installation file in a binary format.

The check value of the file indicated by the file header identifier is a check value of cyclic redundancy check (CRC).

The file indicated by the file header identifier is decompressed into at least one of: a directory of data, a directory of an application (app), and a directory of an application package name.

According to the implementation, when booting the mobile terminal or installing the application, the installation file and the end tag position of the file directory of the installation file are acquired first. And then, the start tag position of the file directory is determined according to the end tag position of the file directory. At last, the file header identifier in the file directory is queried for according to the start tag position of the file directory and the file indicated by the file header identifier is identified via analyzing the file header identifier. In this way, the process of decompressing all files in the installation file can be omitted. Therefore, scan time of the installation file before booting the mobile terminal or installing the application can be reduced, and efficiency of booting the mobile terminal or installing the application can be improved.

It is to be noted that, the above modules (the acquiring module 500, the determining module 501, the identifying module 502, the judging module 503, and the decompressing module 504) are configured to execute related operations of the methods in FIGS. 1-3.

In this implementation, the device is presented in the form of modules. "Module" herein can refer to an application-specific integrated circuit (ASIC), a processor and a memory for executing one or more software or firmware programs, an integrated logic circuit, and/or other components that can achieve the above described functions. In addition, the acquiring module 500, the determining module 501, the identifying module 502, the judging module 503, and the decompressing module 504 can be implemented by the processor 601 of the mobile terminal illustrated in FIG. 6.

Figure 6:
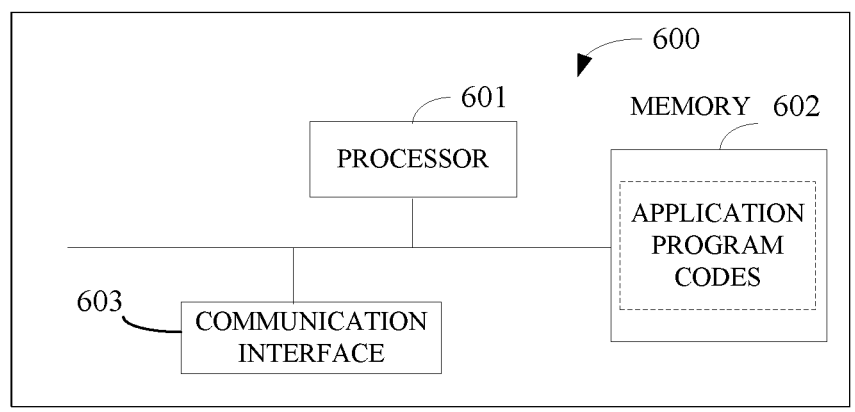
FIG. 6 is a schematic structural diagram illustrating a mobile terminal according to an implementation of the disclosure.

As illustrated in FIG. 6, a mobile terminal 600 can be configured by the structure illustrated in FIG. 6. The mobile terminal 600 includes at least one processor 601, at least one memory 602, and at least one communication interface 603. The processor 601, the memory 602, and the communication interface 603 are connected via a communication bus and achieve mutual communication.

The processor 601 can be a general-purpose central processing unit (CPU), a microprocessor, an application-specific integrated circuit (ASIC), or one or more integrated circuits for controlling execution of programs of the above schemes.

The communication interface 603 is configured to communicate with other devices or communication networks, such as an Ethernet, a radio access network (RAN), a wireless local area network (WLAN), and the like.

The memory 602 may be a read-only memory (ROM) or other types of static storage devices that can store static information and instructions, a random access memory (RAM) or other types of dynamic storage devices that can store information and instructions, or an electrically erasable programmable read-only memory (EEPROM), a compact disc read-only memory (CD-ROM), or other optical disk storage, optical disk storage (including compact discs, laser discs, optical discs, digital versatile discs, blue-ray discs, etc.), magnetic disk storage medium, or other magnetic storage devices, or any other mediums that can be used to carry or store desired program codes in the form of instructions or data structures and can be accessed by a computer. The disclosure is not limited thereto. The memory can be separated from the processor and connected to the processor via a bus. The memory can also be integrated with the processor.

The memory 602 is configured to store application program codes for executing the above schemes. The processor 601 is configured to execute the application program codes stored in the memory 602.

The application program codes stored in the memory 602 can be configured to execute the methods in FIGS. 1-3 executed by the above mobile terminal. For instance, an installation file and an end tag position of a file directory of the installation file are acquired. A start tag position of the file directory is determined according to the end tag position of the file directory. A file header identifier in the file directory is queried for according to the start tag position of the file directory and a file indicated by the file header identifier is identified via analyzing the file header identifier.

Implementations of the present disclosure also provide a computer readable storage medium. The computer readable storage medium can store programs which, when executed, can implement all or part of the operations of any of the methods described in the foregoing method implementations.

Implementations of the present disclosure also provide a computer program product. The computer program product includes a non-transitory computer readable storage medium that stores computer programs. The computer programs are operable with a computer to implement all or part of the operations of any of the methods described in the above method implementations. The computer program product may be a software installation package.

The above described device implementations are merely exemplary. The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations. Those of ordinary skill in the art can understand and implement the technical solutions without creative efforts.

The operations of the methods of the implementations of the present disclosure can be adjusted, combined, and deleted according to actual needs.

The modules or units of the devices of the implementations of the present disclosure can be combined, divided, and deleted according to actual needs.

The modules or units of the implementations of the present disclosure may be implemented as a general-purpose integrated circuit (such as a central processing unit, CPU) or as an application-specific integrated circuit (ASIC).

Through the description of the above implementations, those skilled in the art can clearly understand that various implementations can be implemented via software and a necessary universal hardware platform, or via hardware. Based on such understanding, the technical solutions of the present disclosure essentially, or the part of the technical solutions that contributes to the related art, or all or part of the technical solutions, may be embodied in the form of a software product which is stored in a computer readable storage medium (for example, a read-only memory (ROM), a random-access memory (RAM), Disk, compact disc (CD), or the like) and includes instructions for causing a computer device (which may be a personal computer, a server, or a network device and so on) to perform all or part of the operations described in the various implementations of the present disclosure.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for identifying a file, comprising:
   acquiring an installation file and an end tag position of a file directory of the installation file;
   acquiring a capacity which the file directory occupies of the installation file;
   determining a start tag position of the file directory by determining a distance of the file directory in relative to a start position of the installation file according to the end tag position of the file directory and the capacity which the file directory occupies of the installation file;
   querying for a file header identifier in the file directory according to the start tag position of the file directory;
   acquiring a Lib library directory from the file directory; and
   identifying a file indicated by the file header identifier by analyzing the file header identifier, comprising:
      acquiring the file header identifier containing a first identifier from the Lib library directory, the first identifier being configured to indicate a dynamic link library file; and
      identifying the file indicated by the file header identifier containing the first identifier as a dynamic link library file when the file header identifier is determined to contain the first identifier; and
      determining that a subdirectory of the Lib library directory supports an application binary interface, the file indicated by the file header identifier belonging to the subdirectory, and the file header identifier containing the first identifier.

2. The method of claim 1, wherein identifying the file indicated by the file header identifier by analyzing the file header identifier comprises:
   determining whether the file header identifier contains a second identifier configured to indicate a RenderScript file; and
   identifying the file indicated by the file header identifier as a RenderScript file based on a determination that the file header identifier contains the second identifier.

3. The method of claim 1, further comprising:
   acquiring a capacity of the file indicated by the file header identifier, the most recent modification time at which the file indicated by the file header identifier was modified relative to current time, and a check value of the file indicated by the file header identifier;

determining whether the file indicated by the file header identifier is the same as the dynamic link library file contained in the Lib library directory according to the capacity of the file indicated by the file header identifier, the most recent modification time at which the file indicated by the file header identifier was modified relative to the current time, and the check value of the file indicated by the file header identifier; and decompressing the file indicated by the file header identifier into the Lib library directory based on a determination that the file indicated by the file header identifier is different from the dynamic link library file.

4. A mobile terminal, comprising:

an acquiring module, configured to acquire an installation file and an end tag position of a file directory of the installation file, to acquire a capacity which the file directory occupies of the installation file, to acquire a Lib library directory from the file directory, and to acquire a file header identifier containing a first identifier from the Lib library directory, the first identifier being configured to indicate a dynamic link library file;

a determining module, configured to determine a start tag position of the file directory by determining a distance of the file directory in relative to a start position of the installation file according to the end tag position of the file directory and the capacity which the file directory occupies of the installation file; and an identifying module, configured to query for the file header identifier in the file directory according to the start tag position of the file directory determined by the determining module, to identify a file indicated by the file header identifier containing the first identifier as a dynamic link library file when the file header identifier is determined to contain the first identifier, and to determine that a subdirectory of the Lib library directory supports an application binary interface, the file indicated by the file header identifier belonging to the subdirectory, and the file header identifier containing the first identifier.

5. The mobile terminal of claim 4, wherein the identifying module comprises:

a judging unit, configured to determine whether the file header identifier contains a second identifier configured to indicate a RenderScript file; and a first identifying unit, configured to identify the file indicated by the file header identifier as a RenderScript file when the judging unit determines that the file header identifier contains the second identifier.

6. The mobile terminal of claim 4, wherein the acquiring module is further configured to:

acquire a capacity of the file indicated by the file header identifier, the most recent modification time at which the file indicated by the file header identifier was modified relative to current time, and a check value of the file indicated by the file header identifier; and wherein the mobile terminal further comprises:

a judging module, configured to determine whether the file indicated by the file header identifier is the same as the dynamic link library file contained in the Lib library directory according to the capacity of the file indicated by the file header identifier, the most recent modification time at which the file indicated by the file header identifier was modified relative to the current time, and the check value of the file indicated by the file header identifier; and a decompressing module, configured to decompress the file indicated by the file header identifier into the Lib library directory when the judging module determines that the file indicated by the file header identifier is different from the dynamic link library file.

* * * * *